(12) United States Patent
Rudeen

(10) Patent No.: US 6,426,838 B1
(45) Date of Patent: Jul. 30, 2002

(54) POLARIZATION DEPENDANT MULTI-FOCUS OPTICAL SYSTEM

(75) Inventor: Robert W. Rudeen, Eugene, OR (US)

(73) Assignee: PSC Inc., Webster, NY (US)

( * ) Notice: Subject to any disclaimer, the term of this patent is extended or adjusted under 35 U.S.C. 154(b) by 0 days.

(21) Appl. No.: 09/185,610

(22) Filed: Nov. 4, 1998

(51) Int. Cl.[7] ............... G02B 5/30; G02B 27/28
(52) U.S. Cl. ............ 359/487; 359/495; 359/629; 359/721; 359/722
(58) Field of Search ............... 359/485, 487, 359/488, 490, 493, 494, 495, 721, 732, 629, 839; 351/49, 164, 168

(56) References Cited

U.S. PATENT DOCUMENTS

| | | | | |
|---|---|---|---|---|
| 2,332,958 A | * | 10/1943 | West | 359/490 |
| 3,248,165 A | * | 4/1966 | Marks et al. | 359/490 |
| 4,406,520 A | * | 9/1983 | Sato | 359/487 |
| 4,487,477 A | * | 12/1984 | Helms et al. | 359/636 |
| 4,515,443 A | | 5/1985 | Bly | |
| 5,044,743 A | * | 9/1991 | Ting | 359/493 |
| 5,056,913 A | * | 10/1991 | Tanaka et al. | |
| 5,155,623 A | * | 10/1992 | Miller et al. | 359/636 |
| 5,347,121 A | | 9/1994 | Rudeen | 250/235 |
| 5,351,100 A | * | 9/1994 | Schwenzfeier et al. | 351/164 |
| 5,387,953 A | * | 2/1995 | Minoura et al. | 359/495 |
| 5,479,011 A | | 12/1995 | Rudeen | 250/235 |
| 5,568,315 A | * | 10/1996 | Shuman | 359/487 |
| 5,641,958 A | | 6/1997 | Rudeen | 250/235 |
| 5,671,207 A | | 9/1997 | Park | |
| 5,682,212 A | | 10/1997 | Maurer et al. | |
| 5,757,459 A | * | 5/1998 | Bhalakia et al. | 351/164 |
| 5,867,315 A | * | 2/1999 | Koike et al. | 359/495 |
| 5,993,010 A | * | 11/1999 | Ohzawa et al. | |

FOREIGN PATENT DOCUMENTS

EP    0 517 956    12/1992

OTHER PUBLICATIONS

International Search Report PCT/US99/26091 dated Apr. 20, 2000.

* cited by examiner

Primary Examiner—Ricky D. Shafer
(74) Attorney, Agent, or Firm—Foley & Lardner

(57) ABSTRACT

An optical element has a coating thereon to reflect energy, such as light, of a first polarization into a first focus zone and to allow energy, such as light, of a second polarization orthogonal to the first polarization, to reach a second optical element. The second optical element, which may be reflective, diffractive, holographic, aspherical or have other optical characteristics, acts upon the energy to focus it into a second focus zone. A polarization changing element can be placed between the energy source and the optical element or the polarization can be changed by rotating the energy source. The ability to position energy into different focus zones allows for high speed processing and for the generation of useful beam patterns, such as aiming beams.

3 Claims, 5 Drawing Sheets

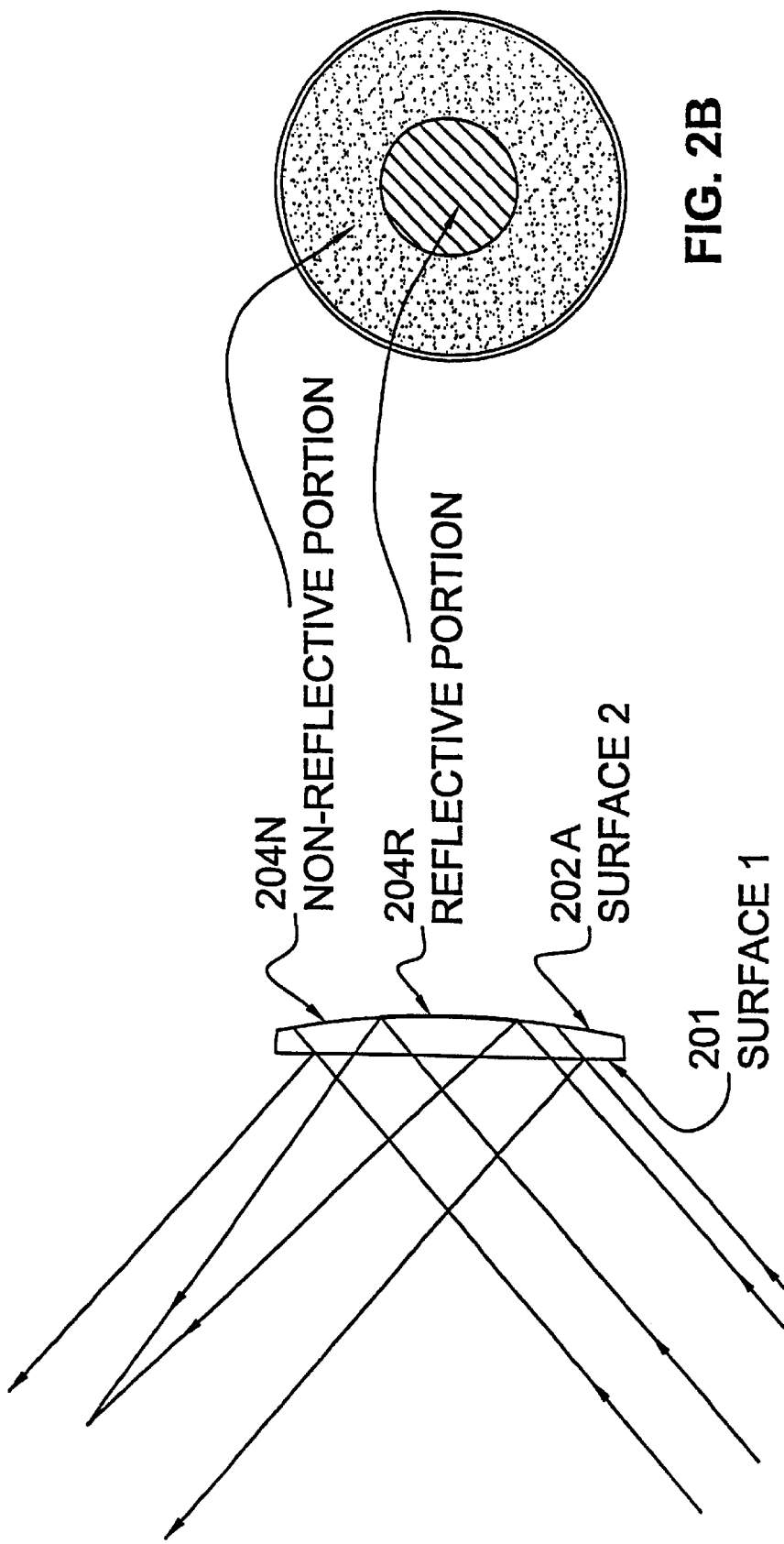

POLARIZATION DEPENDANT MULTI-FOCUS OPTICAL SYSTEM

BACKGROUND

1. Field of the Invention

The invention relates to optical systems generally, and, in particular, to multi-focus optical systems. One such system would include a bar code scanner that focuses at multiple points and/or in different directions to read bar codes located at different distances or locations from the scanner.

2. Related Art

Bar code scanners that focus at different regions in order to read bar codes at different distances from the scanner have been implemented using different lasers for each region. For example, a first laser is used for scanning bar codes in a first region, closer to the scanner, and a second laser is used for scanning bar codes in a secured region further away from the scanner. A disadvantage of such systems is the expense and complexity of multiple lasers and focusing systems.

SUMMARY AND OBJECTS OF THE INVENTION

The invention herein seeks to provide a more efficient method and apparatus for providing a multi-focus optical system. According to the invention, at least two different focal regions can be made from a single polarized optical beam. According to the invention, light of a first polarization reflects off an element having a first reflective surface. Light of a different polarization passes through the first element and is acted upon differently by a second element. The first and second elements can be integrated into a single optical element. The first element is reflective while the second element may be reflective, transmissive or diffractive depending on a desired effect.

In one embodiment, light of one polarization, for example from a laser, is reflected from an optical element having a polarization coating on a first reflecting surface and light of a second polarization is reflected a second reflecting surface with a curvature different from that of the first reflecting surface. Light of a first polarization reflected from the first reflecting surface produces a focal position different from the focal position of light of a second polarization reflected from the second reflecting surface. When applied to a bar code scanner, bar codes located in either region can be read.

BRIEF DESCRIPTION OF THE DRAWINGS

FIG. 2A illustrates side profile of another embodiment of a multifocus optical element according to the present invention.

FIG. 2B illustrates the front view of the embodiment illustrated in FIG. 2A.

DESCRIPTION

Figure 1:
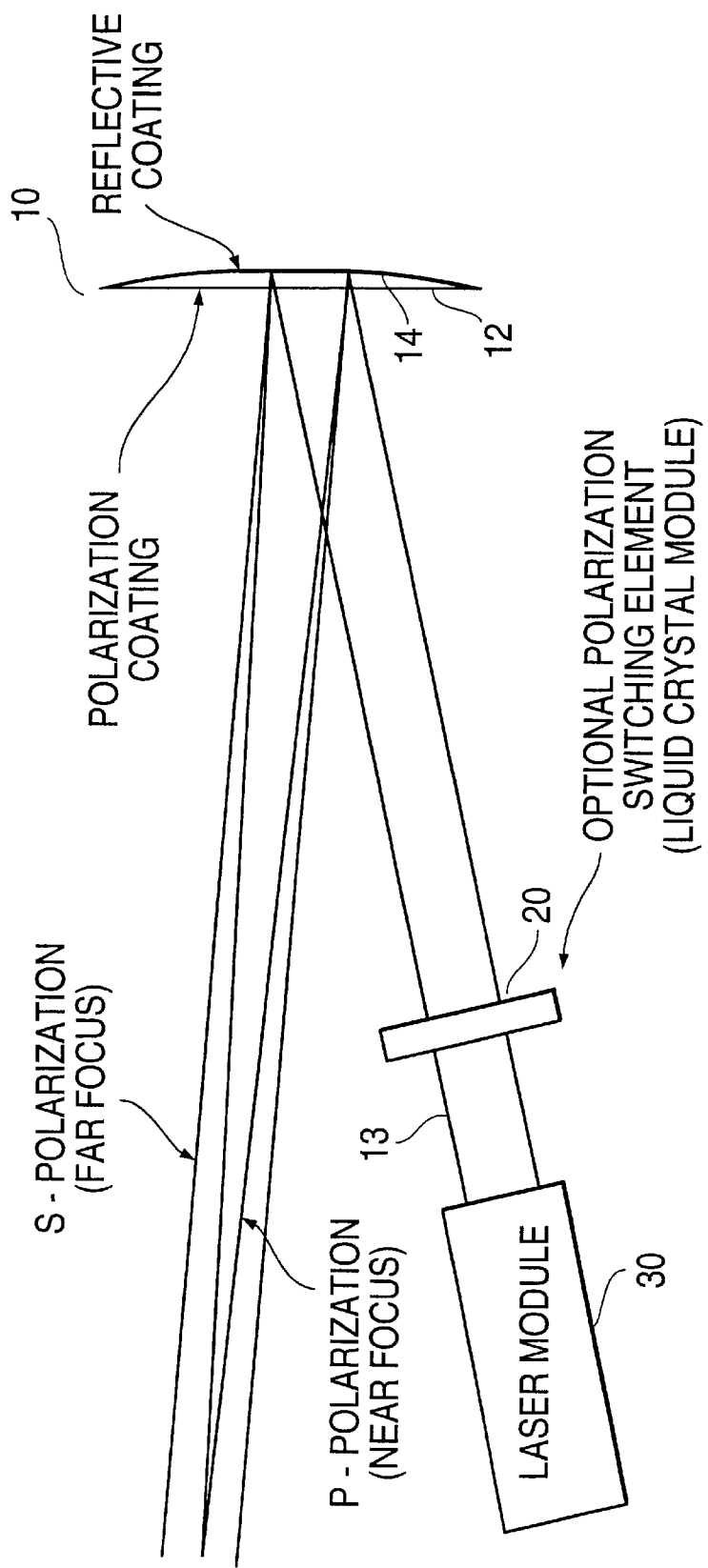
FIG. 1 shows an exemplary embodiment of a multi-focus optical system according to the present invention.

FIG. 1 shows one embodiment according to the invention in which two different focal regions can be made from a single polarized optical beam. FIG. 1 shows a reflecting optical element 10 having a first reflecting optical surface 12 with a first curvature and a second reflecting optical surface 14 with a second curvature, which is different from the first curvature. By placing the optical element 10 in the optical path 13 of light emitted from a source, such as a laser module 30, two different focal regions, corresponding to P and S-polarization of the light, can be produced. In the example shown in FIG. 1, light polarized in S-polarization reflects off the first reflecting surface at a first focal length. Orthogonally polarized light (P-polarization) reflects off the second reflecting surface at a second focal length, which is different from the first focal length.

The above result is accomplished by an optical element 10 with different optical powers at the first and second reflecting surfaces. Specifically, the reflecting optical element can have a front reflecting surface (first surface) 12 with a surface polarization coating to reflect S-polarization and to transmit P-polarization. The back reflecting surface (second surface) 14 is spaced from and downstream of the front surface 12. The S-polarization reflects off the front reflective surface 12 with the polarization coating, while the P-polarization reflects off the back reflective surface 14. In the exemplary embodiment, the front reflecting surface 12 is flat or substantially flat, whereas the back reflecting surface 14 has a concave curvature. Making the front reflecting surface 12 with a smaller curvature (e.g., substantially flat), reduces aberrations in the P-polarization beam. This approach minimizes the impact of the surface on the P-polarization beam reflected from the back reflecting surface 14. Although using a flat reflecting surface simplifies the design, the front surface need not be flat. Front surface 12 can be of any desired shape that achieves the desired focus or other optical effect.

While FIG. 1 shows one useful configuration according to the invention, other configurations can also be made to accommodate various applications. For example, the existence of different path lengths in a bar code scanner can constrain an optical design. In some applications an optical element with curvature may not readily accommodate such different path lengths. Thus, the second surface 14 can be also-made diffractive or transmissive, such as in a beam splitter.

If the back coating is made non-reflective the optical element 10 will act as a polarizing beam splitter, which can provide additional optical power to one of the paths. This approach can be used to correct internal path length differences, for example in some fixed scanner applications. If a portion of the back surface is made reflective, for example, as shown in reflective portion 204 in FIG. 2, the reflective region apertures the p-polarization beam to be reflected.

Surface 12 and/or surface 14 can include a more complex optical surface. In one embodiment, this surface could create a beam that has lower divergence and results in greater depth of field. In another embodiment, such as that shown in FIG. 3, the second surface could generate a beam pattern that can be used as an aiming aid, as discussed further herein.

If the front reflecting surface 12 is made flat, the S-polarization ideally can have a substantially infinite focal length (parallel) or far focus. If the back reflecting surface has a concave surface, as exemplified in FIG. 1, the P-polarization will converge or have a near focus. A reflecting surface having a convex curvature will diverge the reflected light.

Although FIG. 1 shows a plano-convex element 10, the curvatures on each surface can have any degree of curvature to create two different types of reflecting beams. These surfaces can be holographic, diffractive, aspheric, and can be made from plastic or glass. Where plastic is utilized as a substrate, the polarization coating may put too much stress on the plastic substrate. In this case, a glass polarizing plate element can be placed in front of a plastic mirror which has optical power. The light source 30 need not be collimated. The exiting beam from the light source can be converging or diverging.

Figure 2:
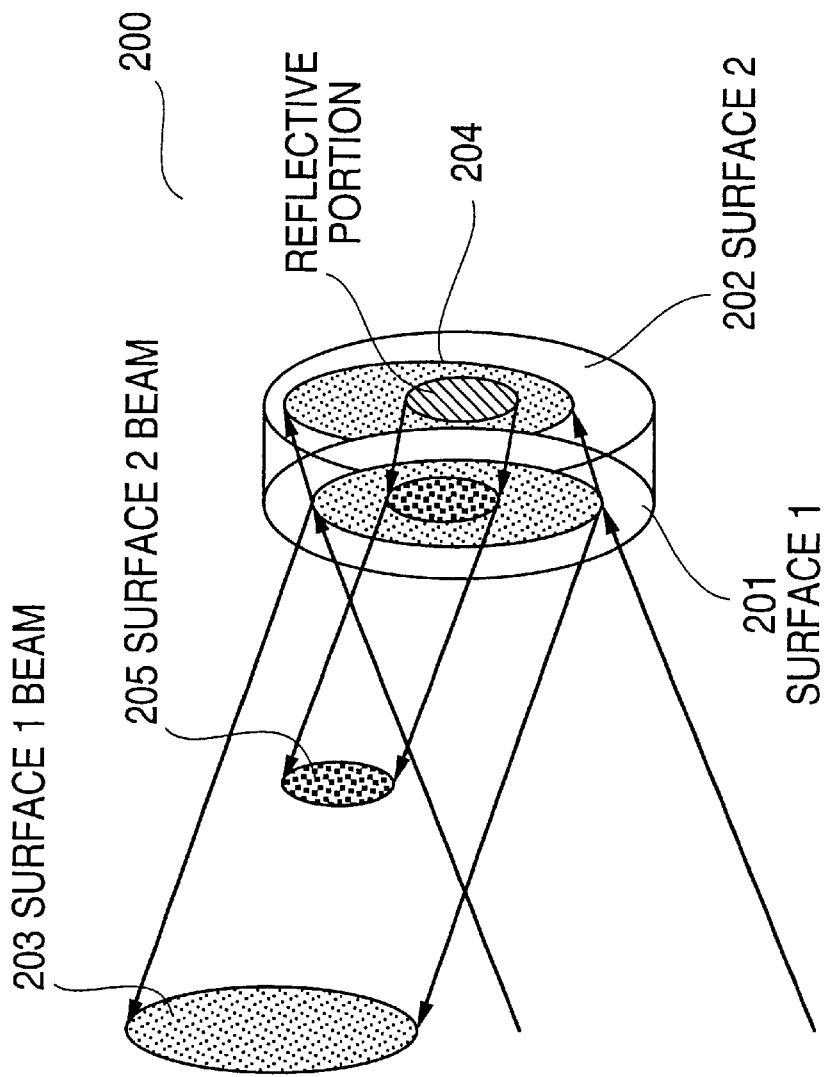
FIG. 2 illustrates an element according to the invention which produces parallel beams.

In a further embodiment, one can selectively coat the reflecting surfaces to define different aperture sizes for each focus zone, for example as shown in FIG. 2. This could also be done with diffractive or higher order aspheric surfaces, which create the appropriate phase profile to define the aperture or waist for that particular zone.

FIG. 2 illustrates another embodiment of the invention where a first surface and a second surface have different reflective properties to create different beams 203, 205. Optical element 200 has a first surface 201 and a second surface 202. Light of a first polarization strikes first surface 201 and is reflected to generate surface 1 beam 203. Light of a second polarization transmits through first surface 201 and intersects second surface 202. At surface 202 a portion of the light strikes the reflective portion to form reflected surface 2 beam 205, while the remainder of the polarized light transmits through the second surface 202, thereby generating the two beams 203, 205 shown in FIG. 2.

FIGS. 2A and 2B illustrate an embodiment that is substantially identical to that of FIG. 2, except that the rear surface 202A is curved, similar to the surface 14 of FIG. 1, to provide a different optical power than that of the front surface 201, which is substantially flat. FIGS. 2A and 2B depict both the non-reflective portion 204N and the reflective portion 204R as being curved.

In some applications, however, it may be useful to customize the amount of power in each focus zone. The amount of power for each focus zone can be customized by rotating the polarization of the beam. For example, as shown in FIG 1, when the light transmitted is entirely S polarization all the reflection is off the front reflecting surface 12 with the surface polarization coating. Rotating the laser module changes the percentage of light having S polarization and P polarization. Thus, at 45 degrees of rotation half the light is S polarized and half is P polarized. Another approach to rotating polarization is to employ a ¼ wave plate either in front of or in place of the polarization switching element 20. The ¼ wave plate rotates the polarization by twice the angle of rotation of the ¼ wave plate. Additional zones can be created by adding another polarization switching element 20 and another reflective element after the first reflective element.

By way of illustration and not limitation, in the embodiment in FIG. 1, a polarization switching element 20, is positioned between the light source 30, and the reflecting optical element 10. The polarization switching element 20 changes the polarization over a period of time to produce different focal lengths at different times. In one embodiment, the polarization switching module 20 can be a liquid crystal module, for example. Such modules are disclosed in U.S. Pat. Nos. 5,347,121, 5,479,011 and 5,641,958 for a variable aperture assigned to PSC, the assignee of the present application, and are incorporated herein by reference.

Polarization switching can also be accomplished with a chopping element, which chops in and out to rotate polarization. Indeed, where polarization switching occurs at a sufficiently high rate, measurements can be made in a small enough time period to allow very high speed processing to improve resolution. Such high speed switching can be accomplished using liquid crystal devices which switch in the microsecond range or chopper devices.

In a bar code scanner example of such a system a bar code is scanned, for example using a scanning mirror, at a relatively slow rate between 30 and 100 milliseconds. Fast switching of the polarization provides fast switching of the focal length in a time period less than the time required to view one element (the minimum element time). This allows acquisition of information from a large spot and a small spot at the same time, so that the signals can be compared for high level processing and improved resolution.

In an aiming beam application, one beam parallel to the scanning beam is visible for use by an operator to position or locate the scanning beam over the code to be scanned. The aiming beam can be any shape. For example, a narrow spot near the center of the scanning beam could be generated for use in aiming. However, other aiming beam shapes could also be generated. For example, the second surface could be formed to generate a beam in the form of a cross hair, triangle or any other desired shape. In an aiming beam application, changing the polarization changes the focus zone of the second beam until the proper focus for scanning is achieved. The scanning is performed by the other beam upon proper orientation of the scanner with the aiming beam. Proper orientation can be indicated either by the operator activating a trigger or automatically by the scanner. An implementation of aiming beam features is disclosed in U.S. patent application Ser. No. 09/058,501 entitled Aiming Aid for Optical Data Reading, assigned to PSC, the assignee of the present application, which is incorporated herein by reference.

Figure 3:
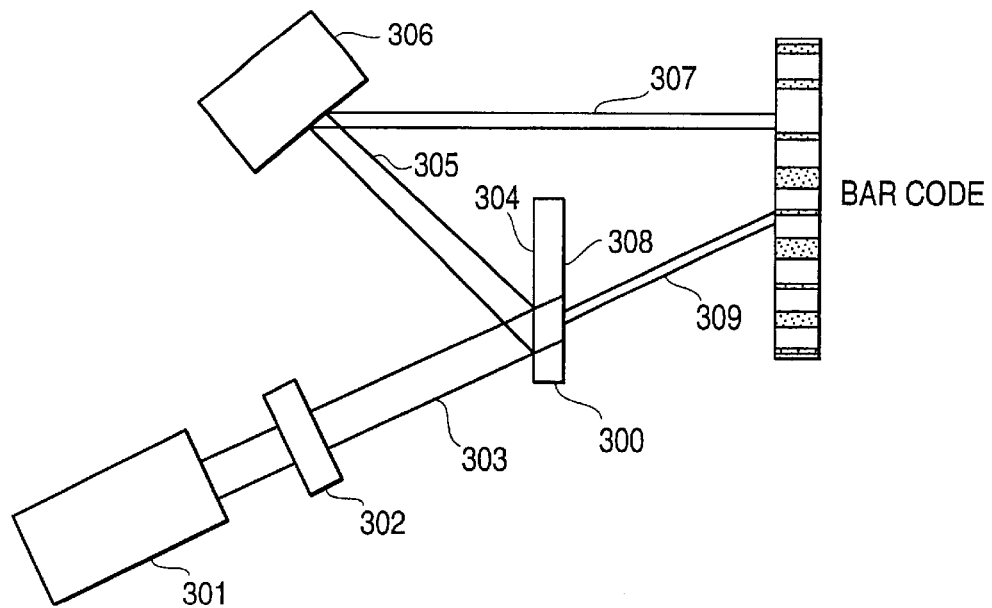
FIGS. 3–5 show examples of systems for forming aiming beams using a multifocal optical device according to the invention.

FIG. 3 illustrates another aiming beam implementation according to the invention using an optical device. In FIG. 3 light source, such as laser 301 directs a beam at polarizing switching element 302. A beam 303 leaving polarization switching element 302 with a first polarization reflects off the first surface 304 of optical element 300 toward scanning mirror 306. Beam 305 is reflected off scanning mirror 306 forming beam 307 which can be used to read a bar code or for some other desired purpose. A beam reaching optical element 302 with a different polarization is transmitted through first surface 304 toward second surface 308. Second surface 308 can be treated with a coating to allow transmission of a beam 309 with the second polarization to act as an aiming beam 309 for use in position the scanner. The coating on the second surface could transmit the aiming beam 309 the form of a cross hair, dot or other desired shape.

Figure 4:
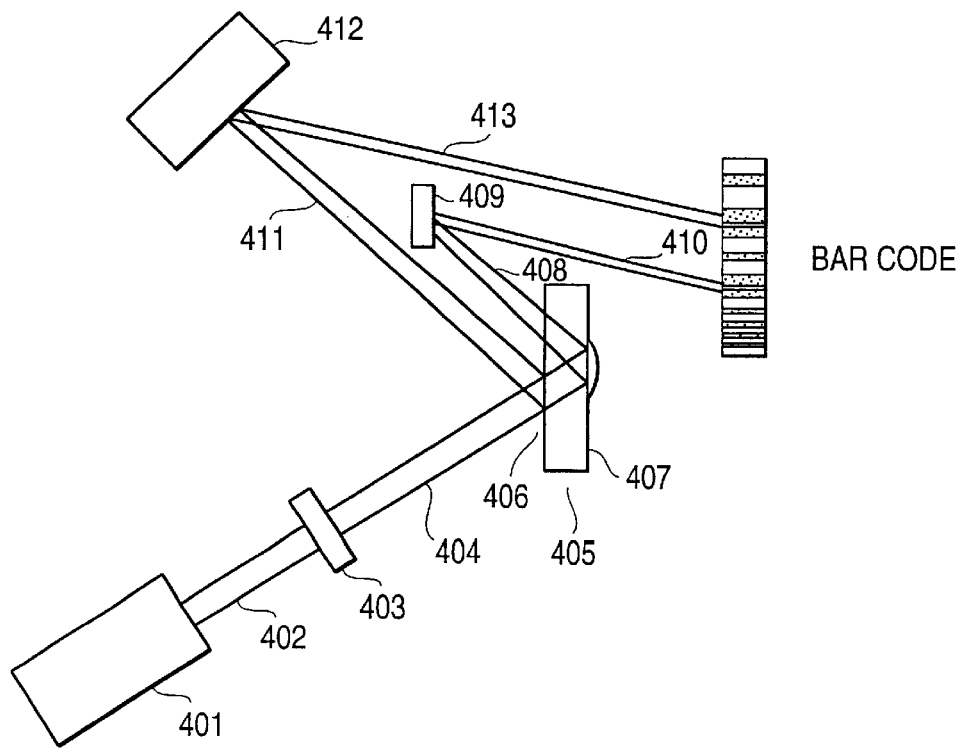

Other aiming beam configurations are also possible using an optical element according to the invention. FIG. 4 is another such example. In FIG. 4, a light source, such as laser 401, directs a beam 402 toward a polarization switching element 403. Beam 404 leaving the polarization switching element 403 is directed to optical element 405 having a first surface 406 and a second surface 407. Light having a first polarization passes through first surface 406 to second surface 407. Second surface 407 has a shape and a coating to form reflected beam 408, which is directed toward fixed mirror 409. Beam 410 reflected from mirror 409 is used as the aiming beam to position the scanner over a bar code to be read. Light of a second polarization reflects off the first surface 406 of optical element 405 forming reflected beam 411, which is directed at scan mirror 412. Beam 413 reflected from scan mirror 412 scans the bar code as scan mirror 412 moves.

Figure 5:
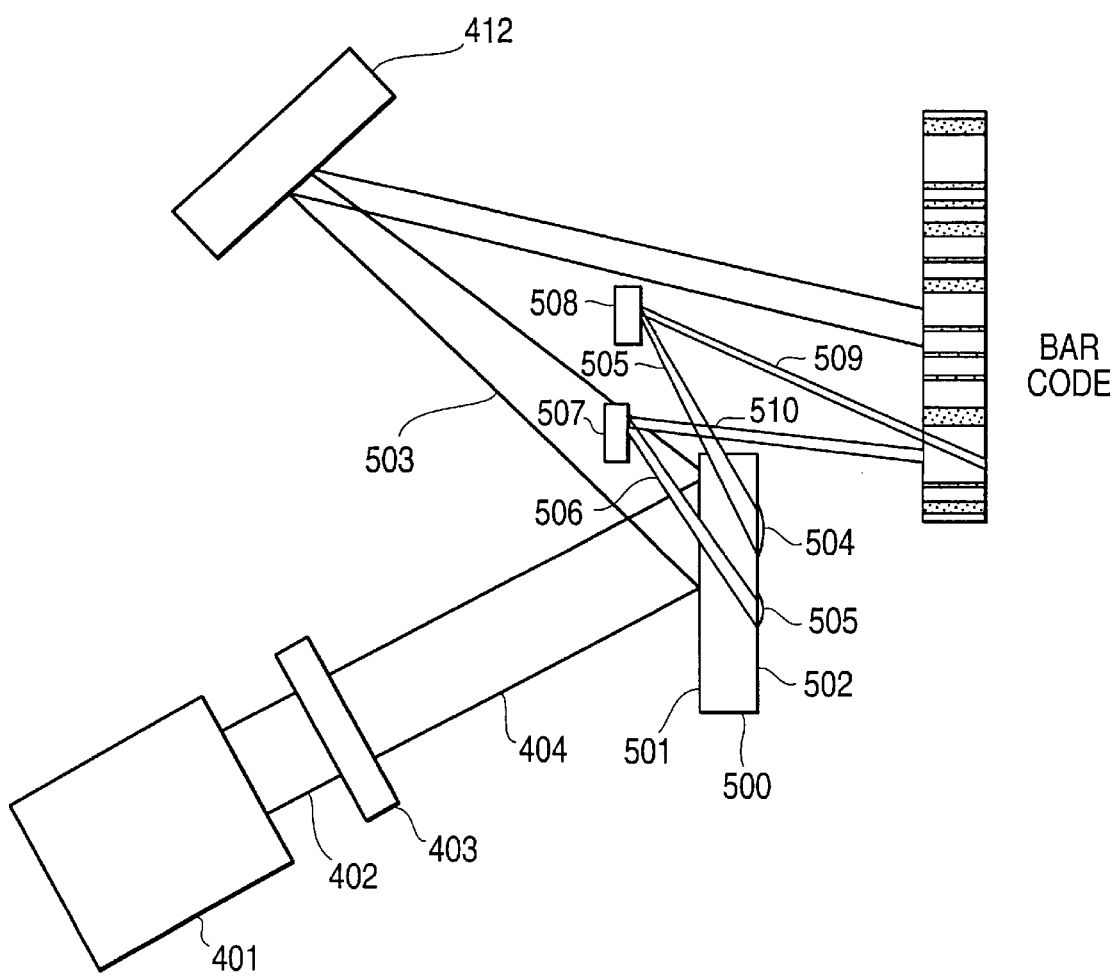

FIG. 5 illustrates a variation on the apparatus shown in FIG. 4. In FIG. 5, optical element 500 has two surfaces, 501 and 502. The first surface 501 reflects a beam 503 of one polarization to rotatable scanning mirror 412 to scan the bar code shown. The second surface 502 of optical element 500 has reflective areas 504 and 505. Each of the reflective areas reflects a beam 505, 506 of orthogonal polarization to that of beam 503 to fixed mirrors 507 and 508. Fixed mirrors 507 and 508 reflect aiming beams 509 and 510 toward the bar code. The use of a pair of aiming beams allows for more accurate positioning of the scanning beam. The aiming beam configurations herein are by way of illustration and not limitation. Other configurations may also be formed using the principles of the optical device according to the invention.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A multifocal optical element comprising:
   a light source; and
   an optical element having a first optical surface and a second optical surface, said first optical surface having a polarization coating thereon reflecting a first polarization of light and transmitting a second polarization of light from said light source, said second optical surface intersecting said second polarization of light transmitting through said first optical surface,
   wherein said second optical surface has a reflective portion to reflect a portion of said second polarization of light back through said first optical surface and a non-reflective portion that does not reflect said second polarization of light that is not reflected by said reflective portion;
   wherein said first optical surface and said second optical surface have different reflective properties to create different beams,
   wherein said first optical surface reflects said first polarization of light with different optical power than said second optical surface reflecting said second polarization of light.

2. A multifocal optical element as recited in claim 1, said first optical surface being substantially flat.

3. A multifocal optical element according to claim 1, wherein the non-reflective portion is transmissive to transmit said second polarization of light that is not reflected by said reflective portion.

* * * * *